United States Patent
Yagi et al.

(10) Patent No.: US 9,187,652 B2
(45) Date of Patent: Nov. 17, 2015

(54) PAINT FILMS WHICH HAVE EXCELLENT HEAT-RADIATING PROPERTIES, AND A METHOD FOR THEIR FORMATION

(75) Inventors: Shinji Yagi, Hyogo (JP); Toshio Yamamoto, Yokohama (JP)

(73) Assignee: BASF Japan Ltd., Tokyo (JP)

( * ) Notice: Subject to any disclaimer, the term of this patent is extended or adjusted under 35 U.S.C. 154(b) by 1240 days.

(21) Appl. No.: 12/514,211

(22) PCT Filed: Oct. 10, 2007

(86) PCT No.: PCT/IB2007/003103
§ 371 (c)(1),
(2), (4) Date: Nov. 9, 2009

(87) PCT Pub. No.: WO2008/056214
PCT Pub. Date: May 15, 2008

(65) Prior Publication Data
US 2010/0129558 A1      May 27, 2010

(30) Foreign Application Priority Data
Nov. 8, 2006   (JP) ................................. 2006-303110

(51) Int. Cl.
| | |
|---|---|
| C09D 5/36 | (2006.01) |
| B05D 7/00 | (2006.01) |
| C09D 7/12 | (2006.01) |
| B05D 1/38 | (2006.01) |
| B05D 5/06 | (2006.01) |
| B05D 7/16 | (2006.01) |
| B05D 3/02 | (2006.01) |
| B05D 3/06 | (2006.01) |
| B05D 5/00 | (2006.01) |
| B05D 7/14 | (2006.01) |
| C08K 3/04 | (2006.01) |
| C08K 3/22 | (2006.01) |
| C08K 9/02 | (2006.01) |

(52) U.S. Cl.
CPC .. *C09D 5/36* (2013.01); *B05D 1/38* (2013.01); *B05D 3/0254* (2013.01); *B05D 3/0263* (2013.01); *B05D 3/0272* (2013.01); *B05D 3/0281* (2013.01); *B05D 3/065* (2013.01); *B05D 3/067* (2013.01); *B05D 3/068* (2013.01); *B05D 5/00* (2013.01); *B05D 5/06* (2013.01); *B05D 5/061* (2013.01); *B05D 7/14* (2013.01); *B05D 7/16* (2013.01); *B05D 7/536* (2013.01); *B05D 7/546* (2013.01); *C09D 7/1216* (2013.01); *B05D 2601/02* (2013.01); *B05D 2601/04* (2013.01); *B05D 2601/06* (2013.01); *B05D 2601/24* (2013.01); *C08K 3/04* (2013.01); *C08K 3/22* (2013.01); *C08K 9/02* (2013.01); *Y10T 428/264* (2015.01)

(58) Field of Classification Search
CPC .............. B05D 1/36; B05D 1/38; B05D 3/02; B05D 3/0254; B05D 7/14; B05D 7/16; B05D 7/50; B05D 7/52; B05D 7/53; B05D 7/534
USPC .......................... 427/407.1, 409, 372.2, 384; 428/411.1–704
See application file for complete search history.

(56) References Cited

U.S. PATENT DOCUMENTS

| | | | | |
|---|---|---|---|---|
| 4,547,410 | A | * 10/1985 | Panush et al. .............. | 427/388.2 |
| 5,958,525 | A | * 9/1999 | Green et al. .................... | 428/14 |
| 5,976,511 | A | * 11/1999 | Ohtsu et al. ..................... | 424/59 |
| 5,997,627 | A | * 12/1999 | Babler .......................... | 106/493 |
| 6,291,018 | B1 | 9/2001 | Dattilo | |

FOREIGN PATENT DOCUMENTS

| | | | |
|---|---|---|---|
| DE | 10346035 A1 | | 6/2005 |
| JP | 06-096682 | | 4/1994 |
| JP | 2002-228085 A | * | 8/2002 |
| JP | 2002228085 A | | 8/2002 |
| JP | 2004027064 A | | 1/2004 |
| JP | 2005139535 A | | 6/2005 |
| JP | 2005238769 A | | 9/2005 |
| WO | WO2007070601 A2 | | 6/2007 |

OTHER PUBLICATIONS

International Search Report of PCT/IB2007/003103 dated Aug. 18, 2008.
Written Opinion of PCT/IB2007/003103 filed Oct. 10, 2007.
Database WPI Week 200311; Thomson Scientific, London, GB; AN 2003-114650; XP-002489547.
International Preliminary Report on Patentability for International Applicaiton No. PCT/IB2007/003103 issued May 12, 2009, 7 pages.

* cited by examiner

*Primary Examiner* — William Phillip Fletcher, III
(74) *Attorney, Agent, or Firm* — Servilla Whitney LLC

(57) ABSTRACT

Disclosed is a paint film which has excellent heat-radiating properties which comprises an undercoat paint film layer which contains from 1 to 20 mass % with respect to the total solid fraction of the paint film of carbon black and a top-coat paint film layer which contains 1 to 40 mass % with respect to the total solid fraction of the paint film of a pearl pigment and which does not contain aluminum powder and the paint film thickness of the top-coat paint film layer is from 11 to 50 μm.

4 Claims, No Drawings

PAINT FILMS WHICH HAVE EXCELLENT HEAT-RADIATING PROPERTIES, AND A METHOD FOR THEIR FORMATION

CROSS REFERENCE TO RELATED APPLICATIONS

This application is a National Phase Application of Patent Application PCT/IB2007/003103 filed on Oct. 10, 2007, which claims priority to JP2006-303110, filed Nov. 8, 2006.

TECHNICAL FIELD

The invention concerns paint films which have excellent heat-radiating properties and a method for their formation.

TECHNICAL BACKGROUND

With the progress which has been made with domestic electrical appliances in recent years the generation of heat has become a problem, and with personal computers the temperature reached as a result of the heat generated by the CPU has risen as higher levels of performance have been achieved. Methods involving the fitting of air-cooling fans have generally been adopted as a counter-measure, but because of miniaturization the fans must be small if they can be used at all, and a box which has a cooling effect even if a fan is not fitted is desirable.

Paint compositions for heat controlling purposes which are characterized by the inclusion of a film-forming component comprising a high condensate which does not include silanol groups of at least one type of compound selected from among the group comprising organosilicon compounds and low-condensates thereof, and mica of particle size not more than 40 µm in an amount of from 100 to 300 parts by weight per 100 parts by weight of said film-forming component and titanium oxide of particle size not more than 1 µm in an amount of from 50 to 200 parts by weight per 100 parts by weight of said film-forming component are known as paint compositions which control heating (for example, see Japanese Examined Patent Publication H6-96682).

However, when this paint is used the titanium oxide and mica are essential components and there is a problem in that they cannot be colored optionally. In particular there is a major weakness in that the provision of black and glitter cannot be achieved for providing design features with color which are essential in the field of domestic electrical appliances.

Furthermore, paint compositions which have excellent heat-radiating properties and electromagnetic wave absorbing properties which are characterized in that they contain as mass % of the solid fraction from 20 to 80% ferrite powder and from 3 to 60% of carbon black powder with the remainder comprising resin, and the amounts of ferrite powder and carbon black powder in the paint are such that 30%≤ferrite powder (%)+carbon black powder (%)≤90% are known as painted metal sheets which have excellent heat-radiating properties and electromagnetic wave absorbing properties (for example, see Japanese Unexamined Patent Application Laid Open 2004-027064).

However, there is a weakness in that the paint film is black because of the carbon black which has been added and it cannot be colored optionally.

Furthermore, painted metal sheets which have excellent heat-radiating properties and coloring properties which have an organic coating layer which contains from 3 to 70 mass % of boron nitride of average particle size from 0.01 to 30 µm of thickness at least 1 µm on at least one side of a metal sheet are known as a means in which carbon black is not used in the top-coat paint. (For example, see Japanese Unexamined Patent Application Laid Open 2005-139535) However, with this method the heat-radiating performance is provided by just the top-coat layer and the heat-radiation properties are poor when compared with a paint film which has a two-layer structure.

Furthermore, heat-radiating surface treated materials which are characterized in that an outer-layer paint film and an inner layer paint film are provided on a base material surface and the inner layer paint film contains from 0.03 to 70 mass % with respect to the dry mass of the inner paint film of a pigment of which the heat reflectance is at least 70%, such as carbon black, alumina, zirconia, titania, silica, zircon, magnesia or the like, are known (for example, see Japanese Unexamined Patent Application Laid Open 2002-228085).

However, with this method there is a weakness in that the thermal emissivity is inevitably lowered by the top-coat paint film.

Furthermore, resin-coated metal sheets where a resin paint film which contains white pigment and/or glitter pigment is coated on one or both of the black colored surfaces of a black colored metal sheet of which one or both sides is black in color and the thickness of said resin paint film is from 0.5 to 10 µm and, moreover, the amount of white pigment and/or glitter pigment which is included in said resin paint film is in total from 1 to 25 mass % and of which the color as an L-value is from 44.0 to 60.0 are known as resin coated metal sheets which have excellent heat-radiating properties as well as scratch resistance and finger-marking resistance (for example, see Japanese Unexamined Patent Application Laid Open 2005-238769).

However, with this method the film thickness of the second layer cannot be great and so there is a weakness in that the satisfactory covering properties which are needed for obtaining designs and multi-colors cannot be maintained.

SUMMARY

The present invention provides paint films which have excellent heat-radiating properties and which can also have many colors with light color systems in the main, and in particular the invention provides paint films of pre-coated steel sheets to which designs in which there is a sense of glitter can be imparted.

As a result of thorough research carried out with a view to resolving the abovementioned problems the inventors have discovered that a pearl pigment set as the specified component which is included in a specified quantity is ideal in the top-coat paint film layer, and that by including a specified amount of carbon black in the undercoat paint film layer and setting the thickness of the top-coat paint layer within a specified range it is possible to realize the intended objective, and the invention is based upon these discoveries.

That is to say, the invention provides a paint film which has excellent heat-radiating properties which comprises an undercoat paint film layer which contains from 1 to 20 mass % with respect to the total solid fraction of the paint film of carbon black and a top-coat paint film layer which contains 1 to 40 mass % with respect to the total solid fraction of the paint film of a pearl pigment and which does not contain aluminum powder, and the paint film thickness of the top-coat paint film layer is from 11 to 50 µm.

Furthermore, the invention provides a paint film which has excellent heat-radiating properties in which, in the abovementioned paint film, the pearl pigment is a pigment where thin plate-like mica powder has been coated on titanium dioxide.

Furthermore, the invention provides a paint film which has excellent heat-radiating properties in which, in the above-mentioned paint film, the top-coat paint film layer contains no metal pigment and metal powder.

Furthermore, the invention concerns a painted metal sheet wherein the abovementioned paint film has been formed on the surface of a metal sheet.

Furthermore, the invention provides a method of forming paint films which have excellent heat-radiating properties wherein an undercoat paint which contains from 1 to 20 mass % with respect to the total solid fraction of the paint film of carbon black is applied and hardened and an undercoat paint film layer is formed and then a top-coat paint which contains 1 to 40 mass % with respect to the total solid fraction of the paint film of a pearl pigment and which does not contain aluminum powder is applied over said undercoat paint film layer and hardened and a top-coat paint film layer of which the paint film thickness is from 11 to 50 μm is formed.

It is possible to obtain excellent heat-radiating properties with a paint film of this invention, it is possible to obtain many colors with light color systems in the main, and in particular the paint film can be used ideally as a paint film for pre-coated steel sheet purposes.

DETAILED DESCRIPTION OF A PREFERRED EMBODIMENT

Carbon black is included in the under-coat paint film in this invention in an amount of from 1 to 20 mass % with respect to the total solid fraction of the paint film. The heat-radiating properties of the paint film can be improved by this means.

The carbon blacks which are generally used as pigments can be used without limitation for the carbon black, and methods of production such as the channel-system and the furnace-system, for example, are known. Examples of commercial carbon blacks include FW200 produced by the Degussa Co., Rarben 1255 produced by the Colombia Carbon Co. and MA100 produced by the Mitsubishi Kagaku Co.

The amount of carbon black included is preferably from 2 to 15 mass %, and most desirably from 3 to 12 mass %, with respect to the total solid fraction of the paint film. With a carbon black content of less than 1 mass % no heat-radiating effect is observed and in those cases where 20 mass % is exceeded the thixotropic nature of the paint is heightened and the painting operability is reduced.

The resin for paint purposes which is included in the under-coat paint film layer should be a resin which is generally used in undercoat paint for pre-coated steel sheets, but epoxy resins and macromolecular polyester resins are preferred. One of these resins may be used individually, or two or more types may be used. The amount of resin included is preferably from 50 to 80 mass % generally, and most desirably from 60 to 75 mass %, as solid fraction with respect to the total solid fraction of the paint film.

Anti-rust pigments may be added to the undercoat paint film layer with a view to improving the corrosion resistance of the coating composition. The known anti-rust pigments can be used and, for example, use can be made of phosphoric acid based anti-rust pigments such as zinc phosphate, iron phosphate, aluminum phosphate, zinc phosphite and the like, molybdic acid based anti-rust pigments such as calcium molybdate, aluminum molybdate and barium molybdate, vanadium based anti-rust pigments such as vanadium oxide, silicate based pigments such as calcium silicate, chromate based anti-rust pigments such as strontium chromate, zinc chromate, calcium chromate, potassium chromate and barium chromate, finely divided silica such as colloidal silica and fumed silica, and ferroalloys such as ferrosilicon. These may be used individually or two or more types can be used. The amount of anti-rust pigment is preferably from 5 to 25 mass % generally, and most desirably from 15 to 20 mass %, with respect to the total solid fraction of the paint film.

Furthermore, organic or inorganic coloring pigments such as titanium oxide, iron oxide and the like which are generally used in undercoat paints for pre-coated steel sheets may be used in the undercoat paint film layer with a view to concealing the base material. Furthermore, true pigments may be used, as required, with a view to providing scratch resistance and improving the fluidity of the paint. The amount of the organic or inorganic coloring pigments and/or true pigments included is preferably from 0.5 to 15 mass % generally, and most desirably from 1 to 10 mass %, with respect to the total solid fraction of the paint film.

The paint film thickness of the undercoat paint film layer is preferably from 1 to 30 μm, and most desirably from 3 to 20 μm. If it is less than 1 μm then the basic functions of corrosion resistance and workability as a pre-coated steel sheet are not obtained and neither are satisfactory heat-radiating properties obtained, and if it exceeds 30 μm then the painting operability is reduced.

The pearl pigment is included in the top-coat paint film layer in this invention in an amount of from 1 to 40 mass % with respect to the total solid fraction of the paint film. It is possible to improve the heat-radiating properties of the paint film markedly in this way. The amount of pearl pigment included is preferably from 2 to 35 mass %, and most desirably from 5 to 30 mass %, with respect to the total solid fraction of the paint film. If the pearl pigment content is less than 1 mass % then a satisfactory effect on the heat-radiating properties is not observed, and if it exceeds 40 mass % then the possibility that the paint film will peel off when severely worked as a pre-coated steel sheet arises.

No particular limitation is imposed upon the pearl pigment and examples include those where natural mica or artificial mica has been coated on titanium dioxide. Actual examples of the pearl pigment include those which are available commercially such as Iriodin (trade name, produced by the Merck Japan Co.). Just one type of pearl pigment alone, or a mixture of two or more types can be used.

The color was limited in the past because a black pigment such as carbon black was used in the top-coat paint to obtain a heat-radiating covering, but in the present invention there is virtually no limitation on the color and colors as required can be obtained easily as a result of the use of a pearl pigment. Furthermore, in the past the aluminum powder was used as the glitter material for imparting designs of a metallic color and so there was a marked decline in the heat-radiating properties, but by using pearl pigments it is possible to impart both heat-radiating properties and metallic color design.

That is to say, aluminum must not be included in the top-coat paint film layer of this invention to avoid a decline in the heat-radiating properties.

Furthermore, the fact that neither metal pigments nor metal powders other than aluminum powder are included in the top-coat paint film is desirable from the viewpoint of avoiding a decline in the heat-radiating properties.

Moreover, in those cases where metal pigments or metal powders must be used in order to impart electrical conductivity to the painted steel sheets for the boxes of personal computers for example, a paint film which has been formed in accordance with the present invention should be used on the surface of the painted steel sheet and a paint which contains metal pigment or metal power for example should be used on the reverse side of the painted steel sheet.

The resin for paint purpose which is included in the top-coat paint film layer should be a resin which is generally used in top-coat paints for pre-coated steel sheet purposes, and the resin components include macromolecular polyester resins, polyester resins, acrylic resins, polyurethane resins, fluorinated resins and modified forms of these resins. Furthermore, the resin component can be used together with crosslinking agents such as butylated melamine, methylated melamine, mixed butylmethyl melamine, urea resins, isocyanates and the like which undergo a crosslinking reaction with the functional groups which are included in the resin component. These single resins and crosslinking agents may be used individually or two or more types can be used. The amount of resin included is preferably from 40 to 90 mass % generally, and most desirably from 50 to 85 mass %, with respect to the total solid fraction of the paint film.

Coloring pigments and dyes can be used in the top-coat paint film layer for design purposes. No particular limitation is imposed upon the coloring pigments, and the known inorganic, organic and complex inorganic/organic pigments can all be used. Actual examples include titanium oxide, red iron oxide (red-ocher), yellow iron oxide, cyanine blue, cyanine green, pyrazolone orange, azo-pigments, Prussian blue and polycyclic pigments, and carbon black may be used, as required. Examples of the dyes include indiogoid dyes, sulfide dyes, phthalocyanine dyes, diphenylmethane dyes, nitro dyes and acridine dyes. No particular limitation is imposed upon the concentration of pigment or dye and it can be selected on the basis of the color and covering power required.

Furthermore, true pigments such as calcium carbonate, talc, gypsum and clay, organic crosslinked fine particles, inorganic fine particles and the like can also be included in the top-coat paint film layer, as required. The amount of true pigment, organic crosslinked particles, inorganic fine particles and the like included is preferably from 0 to 20 mass % generally, and most desirably from 0 to 15 mass %, with respect to the total solid fraction of the paint film.

Furthermore additives such as surface leveling agents, ultraviolet absorbers, hindered amine type photo-stabilizers, viscosity adjusting agents, hardening catalysts, pigment dispersing agents, pigment settling inhibitors and color separation inhibitors, for example, can be included, as required, in the top-coat paint film layer.

The paint film thickness of the top-coat paint film layer of this invention is preferably from 11 to μm, more desirably from 12 to 40 μm, and most desirably from 13 to 30 μm. Satisfactory heat-radiating properties are not obtained with less than 11 μm, and if the thickness exceeds 50 μm then this is wasteful from the economic point of view and, furthermore, the workability as a pre-coated steel sheet becomes unsatisfactory.

The base material to which a paint film of this invention is applied is preferably a metal, more desirably a metal sheet, and most desirably a pre-coated metal sheet. No particular limitation is imposed upon the type of metal sheet, but stainless steel sheets, plated steel sheets and aluminum alloy sheets are appropriate. Examples of stainless steel sheets include ferritic stainless steel sheets, martensitic stainless steel sheets, austenitic stainless steel sheets and the like. Examples of aluminum alloy sheets include JIS 1000 based (pure Al based) sheets, JIS 2000 based (Al—Cu based) sheets, JIS 3000 based (Al—Mn based) sheets, JIS 4000 based (Al—Si based) sheets, JIS 5000 based (Al—Mg based) sheets, JIS 6000 based (Al—Mg—Si based) sheets, JIS 7000 based (Al—Zn based) sheets and the like. The plated steel sheets which have a balance of cost and performance in particular are ideal metal sheets. Examples of plated sheets include zinc plated steel sheets, zinc-iron alloy plated steel sheets, zinc-nickel alloy plated steel sheets, zinc-chromium alloy plated steel sheets, zinc-aluminum alloy plated steel sheets, aluminum plated steel sheets, zinc-aluminum-magnesium alloy plated steel sheets, zinc-aluminum-magnesium-silicon alloy plated steel sheets, aluminum-silicon alloy plated steel sheets, zinc plated stainless steel sheets, aluminum plated stainless steel sheets and the like.

Water washing, hot water washing, acid washing, alkali degreasing, grinding, polishing and the like can be carried out as coating pre-treatments of the metal sheets which are used in the invention and one such treatment alone or a combination of two or more such treatments can be carried out, as required. The coating pre-treatment conditions should be selected appropriately. Chemical forming treatments may be carried out on the metal sheets as required. Chemical forming treatments are treatments carried out to strengthen the adhesion of the coating with the underlying metal sheet and with a view to improving corrosion resistance. The known techniques, such as zinc phosphate treatments, chromate treatments, silane coupling treatments, complex oxide film forming treatments, non-chromate treatments, tannic acid treatments, titania treatments, zirconia treatments and combinations of such treatments for example, are included among the chemical forming treatments.

The paint films which have excellent heat-radiating properties of this invention can be formed using various methods, but formation with a method for the formation of paint films in which an undercoat paint which contains from 1 to 20 mass % with respect to the total solid fraction of the paint film of carbon black is applied and hardened to form an undercoat paint film layer and then a top-coat paint which contains from 1 to 40 mass % with respect to the total solid fraction of the paint film of pearl pigment and which does not contain aluminum is formed over said undercoat paint film layer and hardened to form a top-coat paint film layer of paint film thickness from 11 to 50 μm is preferred.

The components which are included in the abovementioned undercoat paint film layer should be included in the undercoat paint and, furthermore, in addition an organic solvent may be included as a diluent.

The components which are included in the abovementioned top-coat paint film layer should be included in the top-coat paint and, furthermore, in addition an organic solvent may be included as a diluent.

The various organic solvents which are generally used in paints can be used for the organic solvent, and examples include aromatic hydrocarbon based solvents such as toluene, xylene, ethylbenzene and aromatic naphtha, alicyclic hydrocarbon based solvents such as cyclohexane and ethylcyclohexane, ketone based solvents such as acetone, methyl ethyl ketone, methyl isobutyl ketone, cyclohexanone and isophorone, alcohol based solvents such as n-butanol and isobutanol, ester based solvents such as ethyl acetate, n-butyl acetate, isobutyl acetate, 3-methoxybutyl acetate and bis(2-ethylhexyl) adipate, ether based solvents such as dibutyl ether, tetrahydrofuran, 1,4-dioxane and 1,3,5-trioxane, and nitrogen-containing solvents such as acetonitrile, valeronitrile, N,N-dimethylformamide and N,N-diethylformamide. One of these organic solvents can be used individually, or a solvent mixture comprising two or more types can be used. Furthermore, the amount of organic solvent included in the paint is preferably from 30 to 80 mass %, and most desirably from 40 to 65 mass %.

The undercoat paint and top-coat paint used in this invention can be applied with the methods generally used for pre-coated steel sheets. For example, they may be applied using a bar coater, a roll coater, an overflow coater, a slit curtain coater, a roller curtain coater, a T-die, a multi-layer curtain coater or such like coater.

The method of hardening in the processes in which the undercoat paint and top-coat paints used in this invention are hardened and paint films are formed is, for example, hardening by heating and drying with hot draught heating, high frequency induction heating or the like or, depending on the case, hardening by radiation with an electron beam or ultra-violet radiation, and a method which is appropriate for the paint which is being used should be selected.

The paint films of this invention should be formed on at least one side of the metal sheet.

Furthermore, the paint films of this invention are established in a standard form with two layers with an undercoat paint film formed on the surface of the metal sheet and a top-coat paint film layer formed on this undercoat paint film layer, but when there are more than two layers on one side then one layer of the same undercoat paint film layer or a different undercoat paint film layer may be introduced below the undercoat paint film layer and, moreover another layer, the same as the top-coat paint film layer, may be formed over the top-coat paint film layer.

ILLUSTRATIVE EXAMPLES

The invention is described in more detail below by means of illustrative examples, but the invention is not limited by these illustrative examples.

(Preparation of an Undercoat Paint)

Example of Production 1

Production of Undercoat Paint A-1

A solution (60 parts by mass) where the polyester resin Vylon 290 (trade name, produced by the Toyo Boseki Co.) had been dissolved at a rate of 40 mass % in a solvent comprising a 50/50 mixture of Sorbesso 150 (trade name, and aromatic solvent produced by the Exxon Chemical Co.) and cyclohexanone, 3 parts by mass of titanium oxide, 2.5 parts by mass of carbon black, 6.5 parts by mass of K-White 105 (trade name, a white anti-rust pigment produced by the Teika Co.), 11 parts by mass of Sorbesso 150 and 11 parts by mass of cyclohexanone were introduced into a container and dispersed in a sand mill in such a way that the particle size was 20 μm or below and then 4 parts by mass of Cymel 303 (trade name, melamine resin produced by the Nihon Cytec Industries Co., solid fraction 100 mass %), 1 part by mass of Catalyst 602 (trade name, acid catalyst produced by the Nihon Cytec Industries Co.) and 1 part by mass of surface controlling agent were added little by little, with stirring, to provide a uniform mixture and the undercoat paint A-1 was obtained.

Examples of Production 2 and 3

The undercoat paints A-2 and A-3 were produced with the formulations shown in Table 1 using the same method as in Example of Production 1.

(Production of Top-Coat Paints)

Example of Production 4

Production of Top-Coat Paint B-1

A solution (75 parts by mass) where the polyester resin Vylon 240 (trade name, produced by the Toyo Boseki Co.) had been dissolved at a rate of 40 mass % in a solvent comprising a 50/50 mixture of Sorbesso 150 (trade name, and aromatic solvent produced by the Exxon Chemical Co.) and cyclohexanone was introduced into a container, and a paste obtained by wetting 6 parts by mass of Iriodin 103WNT (trade name, a pearl pigment produced by the Merck Japan Co.) with 7.5 parts by mass of Sorbesso 150 and 7.5 parts by mass of cyclohexanone in a separate container was added to this little by little, with stirring, to provide a uniform mixture. Then 2 parts by mass of Cymel 303 (trade name, melamine resin produced by the Nihon Cytec Industries Co., solid fraction 100 mass %), 1 part by mass of Catalyst 602 (trade name, acid catalyst produced by the Nihon Cytec Industries Co.) and 1 part by mass of surface controlling agent were added little by little, with stirring, to provide a uniform mixture and the top-coat paint B-1 was obtained.

Example of Production 5

A solution (50 parts by mass) where the polyester resin Vylon 240 (trade name, produced by the Toyo Boseki Co.) had been dissolved at a rate of 40 mass % in a solvent comprising a 50/50 mixture of Sorbesso 150 (trade name, and aromatic solvent produced by the Exxon Chemical Co.) and cyclohexanone, 3.8 parts by mass of titanium oxide, 0.2 part by mass of red iron oxide, 2.5 parts by mass of Sorbesso 150 and 2.5 parts by mass of cyclohexanone were introduced into a container and dispersed in a sand mill in such a way that the particle size was 10 μm or below, and a paste obtained by wetting 2 parts by mass of Iriodin 103WNT (trade name, a pearl pigment produced by the Merck Japan Co.) with 5 parts by mass of Sorbesso 150 and 5 parts by mass of cyclohexanone in a separate container was added to this little by little, with stirring, to provide a uniform mixture. Then 25 parts by mass of the abovementioned Vylon 240 40 mass % solution, 2 parts by mass of Cymel 303 (trade name, melamine resin produced by the Nihon Cytec Industries Co., solid fraction 100 mass %), 1 part by mass of Catalyst 602 (trade name, acid catalyst produced by the Nihon Cytec Industries Co.) and 1 part by mass of surface controlling agent were added little by little, with stirring, to provide a uniform mixture and the top-coat paint B-2 was obtained.

Examples of Production 6 to 8

The top-coat paints B-3 to B-5 were produced with the formulations shown in Table 2 using the same method as in Example of Production 4 or 5.

Example 1

The undercoat paint A-1 was painted with a bar coater in such a way that the dry paint film thickness was 10 μm onto an electro-zinc plated steel sheet (amount of zinc plating adhered 20 g/m$^2$) of sheet thickness 0.4 mm which had been subjected to an alkali degreasing treatment and a chromate treatment and then baked in a hot draught heating oven under conditions of 260° C. for 60 seconds so that the highest sheet temperature (PMT) was 230° C. and hardened. Then the top-coat paint B-1 was painted with a bar coater in such a way that the dry paint film thickness was 15 μm and baked in a hot draught heating oven under conditions of 260° C. for 60 seconds so that the highest sheet temperature (PMT) was 230° C. and hardened to produce a test sheet and this was submitted for testing. The results of the evaluation are shown in Table 3.

Examples 2 to 5, Comparative Examples 1 to 8

Test sheets were prepared in the same way as in Example 1 and submitted for testing. The results of the evaluations of Examples 2 to 5 are shown in Table 3 and the results of the evaluations of Comparative Examples 1 to 8 are shown in Table 4.

<Test Evaluation Methods>

The methods used to evaluate the painted metal sheets which had been prepared are described below.

Coloring Properties

Whether or not coloring with a coloring pigment was easy was evaluated. The evaluation was carried out by preparing a blue paint with the method described in Example of Production 5 for a top-coat paint by changing the titanium oxide and red iron oxide to cyanine blue and dispersing just cyanine blue. This paint was added in an amount of 0.2 mass % to the top-coat paints B-1 to B-7 and whether or not there was a blue coloration was assessed visually. The assessments were made on the basis of the following criteria:

◯: The blue color was plainly visible
□: The blue color was not readily seen but was discernable
X: The blue color could not be seen Heat-Radiating Properties The evaluation of the heat-radiating properties was carried out by measuring the emissivity. The emissivity was measured with a D&S AERD thermal radiometer (produced by the Kyoto Denshi Co.) by measuring the rise in temperature of the sample on radiating the sample with a fixed quantity of heat. The assessment of the emissivity was carried out on the basis of the following criteria:

◯: Thermal emissivity at least 0.85
□: Thermal emissivity at least 0.7 but less than 0.85
X: Thermal emissivity less than 0.7

Workability

Test specimens which had been cut to a width of 5 cm at room temperature (20° C.) were clamped with one of the same painted sheets as the specimen on the inside and a 180° adhesion test was carried out with the paint film on the outside. The assessment was carried out by observing the end part with a 10 times magnifying glass and the assessment was made on the basis of the following criteria:

◯: No cracking
□: Cracking less than 20%
X: Cracking 20% or more

TABLE 1

|  | A-1 | A-2 | A-3 |
|---|---|---|---|
| Vylon 290 (40 mass % solution | 60.0 | 60.0 | 60.0 |
| Titanium oxide | 3.0 | 1.5 | 4.0 |
| Carbon black | 2.5 | 4.5 | 0.2 |
| K-White | 6.5 | 6.0 | 8.0 |
| Sorbesso 150 | 11.0 | 11.0 | 10.9 |
| Cyclohexanone | 11.0 | 11.0 | 10.9 |
| Cymel 303 | 4.0 | 4.0 | 4.0 |
| Acid catalyst (Catalyst 602, 47 mass % solution) | 1.0 | 1.0 | 1.0 |
| Surface controlling agent*[1] (50 mass % solution) | 1.0 | 1.0 | 1.0 |
| Total | 100.0 | 100.0 | 100.0 |
| Resin solid fraction | 28.0 | 28.0 | 28.0 |
| Pigment fraction | 12.0 | 12.0 | 12.2 |
| Other solid fraction | 1.0 | 1.0 | 1.0 |
| Total solid fraction in the paint film | 41.0 | 41.0 | 41.2 |
| Proportion of carbon black in respect of the total solid fraction (mass %) | 6.1 | 11.0 | 0.5 |

The * mark in this table has the significance indicated below.
*[1]Miki Leveling MK Conc (produced by the Kyoeisha Kagaku Co.)

TABLE 2

|  | B-1 | B-2 | B-3 | B-4 | B-5 | B-6 | B-7 |
|---|---|---|---|---|---|---|---|
| Vylon 240 (40 mass % solution) | 75.0 | 50.0 | 50.0 | 52.5 | 75.0 | 68.0 | 75.0 |
| Titanium oxide |  | 3.8 | 5.6 |  |  |  |  |
| Red iron oxide |  | 0.2 | 0.2 |  |  | 0.2 | 0.2 |
| Carbon black |  |  |  |  |  | 3.0 |  |
| Sorbesso 150 |  | 2.5 | 2.5 |  |  |  |  |
| Cyclohexanone |  | 2.5 | 2.5 |  |  |  |  |
| Iriodin 103WNT | 6.0 | 2.0 | 0.2 | 19.0 | 3.5 |  |  |
| Alpaste 1109M*[2] |  |  |  |  | 3.0 |  | 9.0 |
| Sorbesso 150 | 7.5 | 5.0 | 5.0 | 12.7 | 7.5 | 12.4 | 5.9 |
| Cyclohexanone | 7.5 | 5.0 | 5.0 | 12.7 | 7.0 | 12.4 | 5.9 |
| Vylon 240 (40 mass % solution) |  | 25.0 | 25.0 |  |  |  |  |
| Cymel 303 | 2.0 | 2.0 | 2.0 | 1.4 | 2.0 | 2.0 | 2.0 |
| Acid catalyst (Catalyst 602, 47 mass % solution) | 1.0 | 1.0 | 1.0 | 0.7 | 1.0 | 1.0 | 1.0 |
| Surface controlling agent*[1] (50 mass % solution) | 1.0 | 1.0 | 1.0 | 1.0 | 1.0 | 1.0 | 1.0 |
| Total | 100.0 | 100.0 | 100.0 | 100.0 | 100.0 | 100.0 | 100.0 |
| Resin solid fraction | 32.0 | 32.0 | 32.0 | 22.4 | 32.0 | 29.2 | 32.0 |
| Pigment fraction | 6.0 | 6.0 | 6.0 | 19.0 | 5.5 | 3.2 | 5.9 |
| Other solid fraction | 1.0 | 1.0 | 1.0 | 0.8 | 1.0 | 1.0 | 1.0 |
| Total solid fraction in the paint film | 39.0 | 39.0 | 39.0 | 42.2 | 38.5 | 33.4 | 38.9 |
| Proportion of carbon black in respect of the total solid fraction (mass %) | 14.4 | 5.1 | 0.5 | 45.0 | 9.1 | 0.0 | 0.0 |

The * marks in this table have the significance indicated below.
*[1]Miki Leveling MK Conc (produced by the Kyoeisha Kagaku Co.)
*[2]Aluminum powder (65 mass %, produced by the Toyo Aluminum Co.)

TABLE 3

|  | Example 1 | Example 2 | Example 3 | Example 4 | Example 5 |
|---|---|---|---|---|---|
| Undercoat Paint | A-1 | A-1 | A-1 | A-1 | A-2 |
| Proportion of carbon black (mass %) | 6.1 | 6.1 | 6.1 | 11.0 | 11.0 |
| Paint film thickness (μm) | 10 | 10 | 15 | 15 | 10 |
| Top-coat Paint | B-1 | B-2 | B-1 | B-1 | B-2 |
| Proportion of pearl pigment (mass %) | 15.4 | 5.1 | 15.4 | 15.4 | 5.1 |
| Paint film thickness (μm) | 15 | 20 | 30 | 45 | 30 |
| Coloring | ◯ | ◯ | ◯ | ◯ | ◯ |
| Heat radiating properties (emissivity) | ◯ | ◯ | ◯ | ◯ | ◯ |
| Workability | ◯ | ◯ | ◯ | ◯ | ◯ |

TABLE 4

|  | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 |
| --- | --- | --- | --- | --- | --- | --- | --- | --- |
| Undercoat Paint | A-1 | A-1 | A-3 | A-1 | A-1 | A-1 | A-1 | A-1 |
| Proportion of carbon black (mass %) | 6.1 | 6.1 | 0.0 | 6.1 | 6.1 | 6.1 | 6.1 | 6.1 |
| Paint film thickness (μm) | 10 | 10 | 10 | 10 | 10 | 10 | 10 | 10 |
| Top-coat Paint | B-1 | B-1 | B-1 | B-3 | B-4 | B-5 | B-6 | B-7 |
| Proportion of pearl pigment (mass %) | 15.4 | 15.4 | 15.4 | 0.5 | 45.0 | 9.2 | 0 | 0 |
| Paint film thickness (μm) | 8 | 55 | 15 | 20 | 15 | 15 | 15 | 15 |
| Coloring | ○ | ○ | ○ | ○ | ○ | ○ | x | □ |
| Heat radiating properties (emissivity) | □ | ○ | □ | □ | ○ | x | ○ | x |
| Workability | ○ | x | ○ | ○ | x | ○ | ○ | ○ |

The invention claimed is:

1. A paint film having heat-radiating properties, comprising:
   an undercoat paint film layer comprising from 1 to 20 mass % of carbon black with respect to the total solid fraction of the undercoat paint film layer, and
   a top-coat paint film layer having a film layer thickness of from 11 to 40 μm and comprising from 1 to 40 mass % of a pearl pigment with respect to the total solid fraction of the top-coat paint film layer and which does not contain aluminum powder,
   wherein the thermal emissivity of the paint film is at least 0.85.

2. The paint film of claim 1, wherein the pearl pigment comprises mica and titanium dioxide.

3. A painted metal sheet, comprising a metal sheet having the paint film of claim 1 formed on a surface of the metal sheet.

4. A method of forming paint films having heat-radiating properties, comprising:
   applying to a surface of a substrate an undercoat paint comprising from 1 to 20 mass % of carbon black with respect to the total solid fraction of an undercoat paint film layer black,
   hardening the applied undercoat paint to form the undercoat paint film layer,
   applying to the undercoat paint film layer a top-coat paint comprising 1 to 40 mass % of a pearl pigment with respect to the total solid fraction of a top-coat paint film layer and which does not contain aluminum powder, and
   hardening the applied top-coat paint to form the top-coat paint film layer having a paint film thickness of from 11 to 40 μm.

* * * * *